(12) United States Patent
Dolan

(10) Patent No.: US 10,611,004 B2
(45) Date of Patent: Apr. 7, 2020

(54) ROTATION ANGLE INDICATING RETAINER ASSEMBLY FOR TIGHTENING THREADED FASTENERS

(71) Applicant: HYTORC Division UNEX Corporation, Mahwah, NJ (US)

(72) Inventor: Michael F. Dolan, Manasquan, NJ (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 0 days.

(21) Appl. No.: 15/573,830

(22) PCT Filed: May 10, 2016

(86) PCT No.: PCT/US2016/031648
§ 371 (c)(1),
(2) Date: Nov. 13, 2017

(87) PCT Pub. No.: WO2016/183082
PCT Pub. Date: Nov. 17, 2016

(65) Prior Publication Data
US 2018/0257203 A1 Sep. 13, 2018

Related U.S. Application Data

(60) Provisional application No. 62/159,941, filed on May 11, 2015.

(51) Int. Cl.
*B25B 21/00* (2006.01)
*F16B 31/02* (2006.01)
*B25B 23/145* (2006.01)

(52) U.S. Cl.
CPC .......... *B25B 21/002* (2013.01); *B25B 21/005* (2013.01); *B25B 23/145* (2013.01); *F16B 31/02* (2013.01)

(58) Field of Classification Search
CPC ... B25B 21/002; B25B 21/005; B25B 23/145; B25B 23/14; B25B 23/1405;
(Continued)

(56) References Cited

U.S. PATENT DOCUMENTS

| | | | | |
|---|---|---|---|---|
| 2012/0090864 A1* | 4/2012 | Junkers | ................... | B25B 21/00 173/218 |
| 2012/0096997 A1* | 4/2012 | Corbett | ................... | B25B 23/14 81/473 |

FOREIGN PATENT DOCUMENTS

DE   2914287   * 11/1980

* cited by examiner

*Primary Examiner* — Harshad R Patel
*Assistant Examiner* — Nigel H Plumb
(74) *Attorney, Agent, or Firm* — Justin B. Bender, Esq.

(57) ABSTRACT

A rotation angle indicating retainer assembly for use with and/or integrated with a hydraulically driven device for tightening and loosening a threaded fastener is disclosed and includes: a retainer cap assembly having a hollow cylindrical shape with an upper hollow portion, a lower hollow portion, a hollow disc, a ring having polygonal connection formations and a ball bearing assembly; a plunger assembly having a cylindrical shape with a connection portion, a depression portion, a compression spring and a lower retaining ring; a rotation angle scale assembly having a hollow cylindrical shape with an upper hollow disc with an arrow indicator and a lower portion having polygonal formations; a rotation angle indicator assembly having a substantially hollow cylindrical shape with an upper rotation angle dial, a lower portion having a rotation angle scale, an upper retaining ring, a wave spring and friction ring; and wherein the rotation angle scale assembly is nonrotatably attachable to a driving portion of a housing of the device, and wherein the retainer cap assembly is nonrotatably attachable to a square drive shaft torque output assembly of the device.

(Continued)

Advantageously the rotation angle indicating retainer assembly: is not connected with a device power source; is not used in a feedback loop between the device, the device power source and/or the fastener; is able to be zeroed once an operator wishes to observe an angle of rotation of the fastener; is of unitary construction; requires no loose parts or external implements to engage and secure a drive shaft to the drive head of the tool; reduces likelihood of tool failure during operation due to improper engagement of the drive shaft; and increases user safety during tool operation.

12 Claims, 4 Drawing Sheets

(58) Field of Classification Search
CPC ... B25B 23/1453; F16B 31/02; G01L 25/003; G01L 3/24; G01L 3/00; G01D 5/24433
See application file for complete search history.

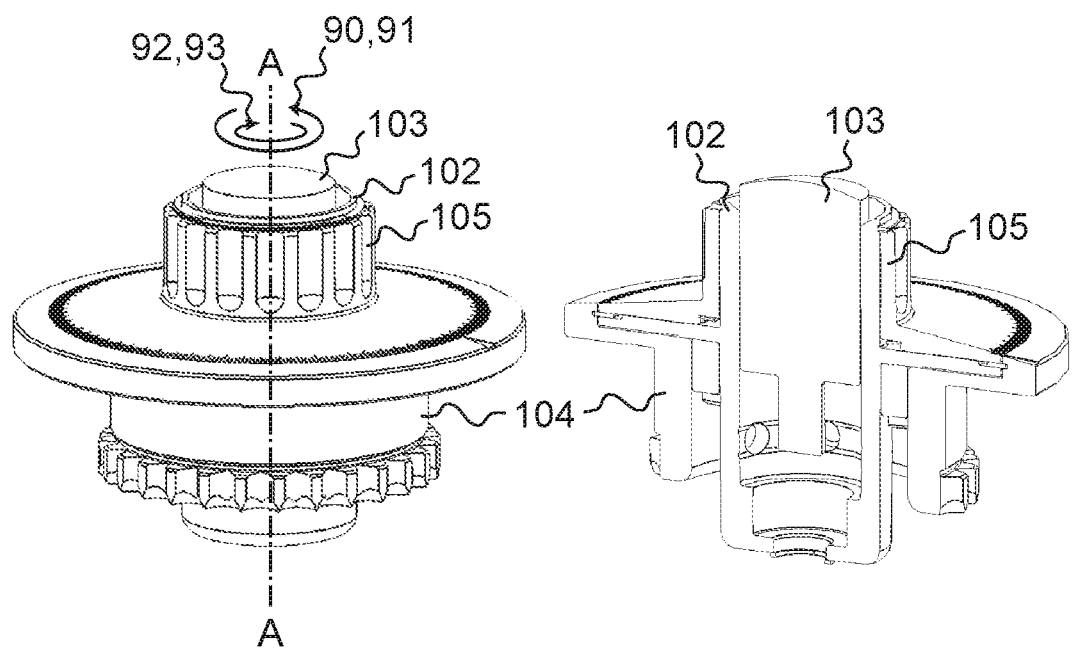
Fig. 1A    Fig. 1B
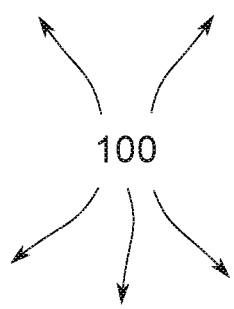
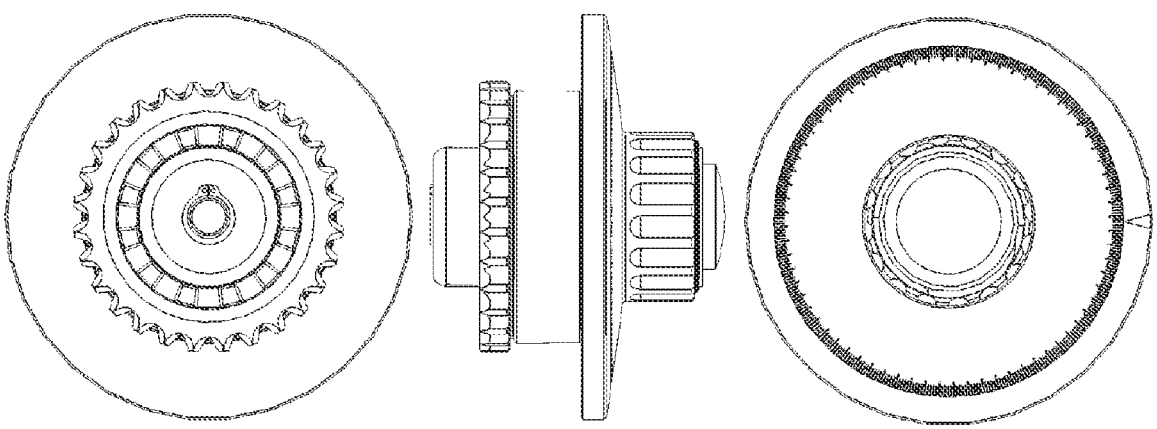
Fig. 1C    Fig. 1D    Fig. 1E

ROTATION ANGLE INDICATING RETAINER ASSEMBLY FOR TIGHTENING THREADED FASTENERS

CROSS REFERENCE TO RELATED APPLICATIONS

This application claims priority to co-pending U.S. Patent Application Ser. No. 62/159,941, having Filing Date of 11 May 2015, entitled "APPARATUS FOR TIGHTENING THREADED FASTENERS", an entire copy of which is incorporated herein by reference.

FIELD OF THE INVENTION

The present invention relates generally to a torque angle measuring device. More particularly, the present invention relates to a manual torque angle measuring device for use with retainers for drive shafts in hydraulic torque wrenches.

BACKGROUND

Threaded fasteners including bolts, studs, nuts and washers are known and used in traditional bolting applications. Maintenance and repair of industrial applications begin with loosening of and end with tightening of these threaded fasteners. Naturally industry seeks to reduce production loss during routine, unforeseen and/or emergency maintenance and/or repair. The importance of accurately and consistently controlling tension and/or preload applied to threaded fasteners increases with precision or criticality of parameters and tolerances of the industrial application as a whole.

There are two methods of tightening and/or loosening a bolt, torque and tension. Until Applicant's innovations, however, it was not possible to perform hydraulic torqueing and hydraulic tensioning with the same tool. Operators needed separate tools to torque and tension threaded fasteners.

Torque has benefits in that it: can be applied to most existing threaded fasteners; is accurate within five percent (5%) of pre-calculated turning resistance of nut; avoids unintended loosening; assures more even circumferential bolt load than tension; and overcomes uneven lubrication applications, foreign particulate underneath the nut or on top of the flange and minor thread damage. Torque, however, has detriments in that it: is subject to thread friction and facial friction, both of which are unknown; requires use of back-up wrench applied to the nut on the other side of the application to keep still the bottom portion of the threaded fastener; results in unknown residual bolt load; and is subject to bolt torsion and side load, both of which adversely affect bolting applications. Sustainable and accurate use of torque in bolting requires establishing thread and bearing facial frictions and eliminating torsion and side load.

Tension has benefits in that it is torsion- and side load-free. Tension, however, has detriments in that it: requires the bolt to stick out by at least its diameter over and about the nut, so that it can be pulled upwards by a tensioner, which often necessitates bolt and nut replacement; is accurate only within 25% of assumed turning resistance; yields unpredictable, manual nut seating; is subject to thread friction and facial friction, both of which are unknown; often over pulls, not stretches the fastener; results in uncontrollable fastener relaxation due to load transfer from puller; and results in unknown residual bolt load. Sustainable and accurate use of tension in bolting requires eliminating stud/bolt pulling and load transfer.

Torque power tools are known in the art and include those pneumatically, electrically and hydraulically driven. Torque power tools produce a turning force to tighten and/or loosen the threaded fastener and an equal and opposite reaction force. Hydraulic tensioners use a puller to apply hydraulic pressure to the bolt, which is usually results in a 10%-20% higher than desired bolt elongation, causing the stud to be over pulled. Then the nut is hand tightened until snug; the pressure on the cylinder is released; the stud springs back; and the load is transferred from the bridge to the nut thereby compressing the joint with clamping force.

Conventionally, hydraulic torqueing of threaded fasteners for industrial applications may be controlled by monitoring operation parameters including either hydraulic or pneumatic fluid pressures or flow rates, electrical circuit parameters such as current, voltage or magnetic field, torque output values, rotation speeds, or a combination of such. Fastener load control through such monitoring may yield unpredictable and inconsistent results due to, similar inherent drawbacks as described above. Where it has been attempted to obtain greater uniformity through use of lubricants or the like, results have continued to be unsatisfactory.

Another approach has been to electronically monitor torque as a function of angle of rotation. Such arrangements still do not directly measure fastener tension, and in addition require expensive assembly and control hardware. A third approach has been to tighten the fastener while reacting off of the stud, the washer or an adjacent stationary object. A subset of this approach is tightening to a point at which the fastener material yields and a splined fastener head separates from the threaded body. Arrangements of this type suffer from similar inherent drawbacks as described above and increased cost and system complexity.

A further technique for controlling fastener preload has been found to yield particularly consistent results. This technique, termed "torque-turn" or "torque-angle," involves initially tightening the fastener to a specified torque, and thereafter tightening the fastener through an additional predetermined angle. The initial tightening torque is empirically predetermined to be one at which the fastener is tightened in assembly but has not yet been substantially elastically stretched. By thereafter tightening the fastener through an additional angle or fraction of a turn, advantage is taken of the precision machining of the fastener threads so as to obtain predetermined elastic stretching of the fastener within the assembly.

Particular to hydraulically operated torque and tension tools there remains a need in the art for inexpensive equipment that may be employed by operators in the field for obtaining precision control of fastener loading. Additionally, the products on the market that perform such a function are large and cumbersome. These products use torque angle detection techniques that inhibit their ability as well as for the operability in constrained spaces.

Retainers for drive shafts in hydraulic torque wrenches are well known and often include bushings or bearings using conventional spring clips, snap rings and/or separate cap assemblies. Often special tools are needed to install or remove these prior art solutions. Absent due care, components of prior art solutions are lost or damaged during tightening and/or loosening operations. Prior art solutions may include an attached chain or lanyard between the spring clip, snap ring and/or cap assembly and the drive shaft to reduce component loss and/or damage and increase safety. The chain or lanyard, however, is undesirably loose and dangles off of the tool. Operators often operate torque wrenches with improperly retained drive shafts. Components of prior art solutions not properly seated often come off creating dangerous and unsafe operating conditions.

Applicant offers viable solutions with respect to retainers of unitary construction for drive shafts in hydraulic torque wrenches per co-pending Patent Cooperation Treaty Application Serial No. PCT/US2014/050002, having Filing Date of 6 Aug. 2014, entitled "APPARATUS FOR TIGHTENING THREADED FASTENERS", an entire copy of which is incorporated herein by reference.

No viable solutions exist for integration of torque and angle with hydraulic torque wrenches which: limit inherent drawbacks as described above; increase operator safety through unitary construction; may be used in all industrial bolting situations, whether regular or limited clearance; and decrease bolting system cost and complexity.

Accordingly, it is desirable to provide a device that is capable of determining the angle of rotation applied to a fastener as well as display the current angle of rotation.

DESCRIPTION OF INVENTION

A rotation angle indicating retainer assembly for use with and/or integrated with a hydraulically driven tool for tightening and loosening a threaded fastener is invented and disclosed. It includes: a retainer cap assembly; a plunger/button assembly; a rotation angle scale assembly; and a rotation angle indicator assembly. Advantageously the rotation angle indicating retainer assembly: is not connected with a device power source; is not used in a feedback loop between the device, the device power source and/or the fastener; is able to be zeroed once an operator wishes to observe an angle of rotation of the fastener; is of unitary construction; requires no loose parts or external implements to engage and secure a drive shaft to the drive head of the tool; reduces likelihood of tool failure during operation due to improper engagement of the drive shaft; and increases user safety during tool operation.

The invention may be described, by way of example only, with reference to the accompanying drawings, of which:

FIG. 1A shows an isometric cross-sectional perspective view of a rotation angle indicating retainer assembly of the present invention;

FIG. 1B shows an isometric perspective view of the assembly of FIG. 1;

FIG. 1C shows a bottom view of the assembly of FIG. 1;

FIG. 1D shows a side view of the assembly of FIG. 1;

FIG. 1E shows a top view of the assembly of FIG. 1;

Figure 2:
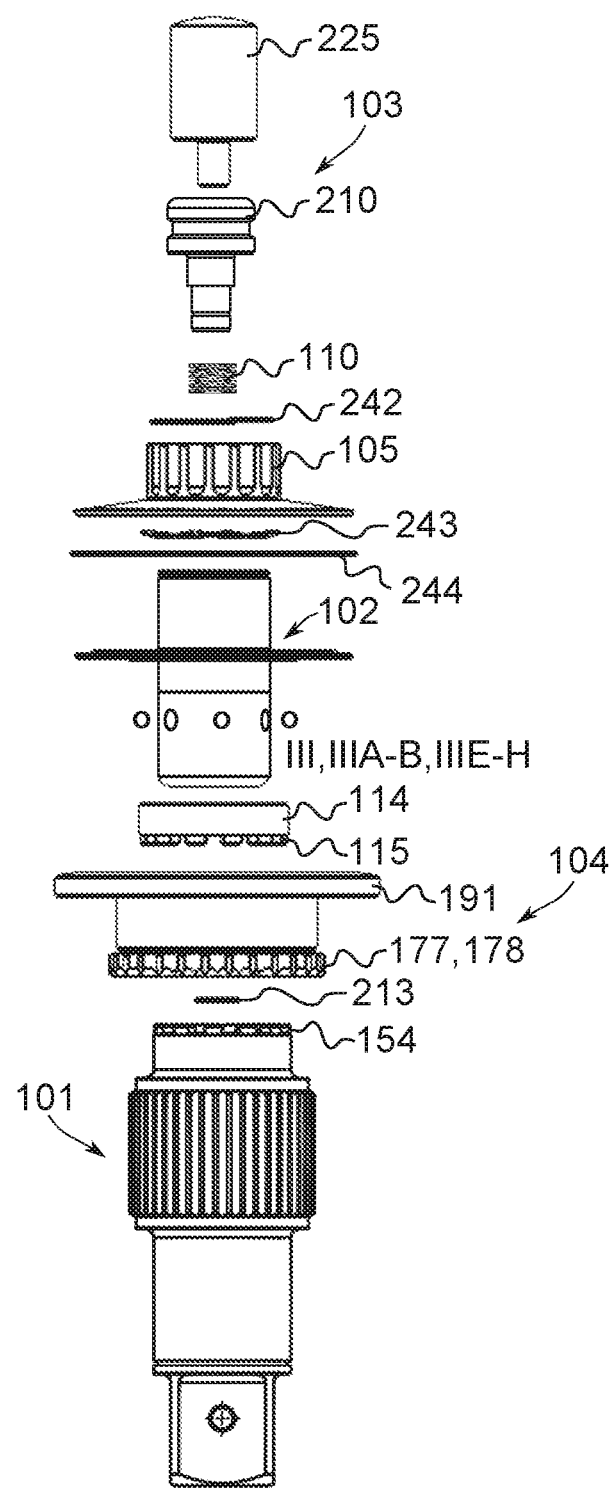
FIG. 2 shows an exploded side view of the assembly of FIG. 1.
Figures 3A, 3B, 3C, 3D, 3E:
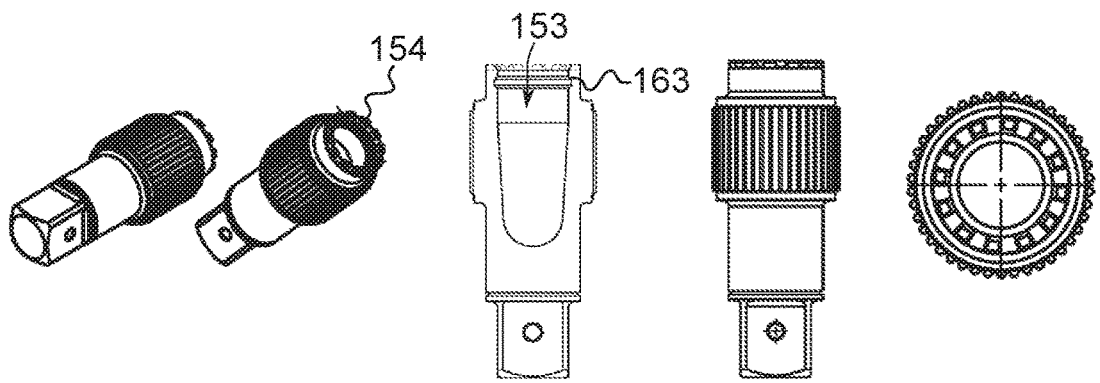
FIGS. 3A-3E show various views of a drive shaft assembly of a hydraulically driven tool for use with or integrated the assembly of FIG. 1.
Figures 4A, 4B, 4C:
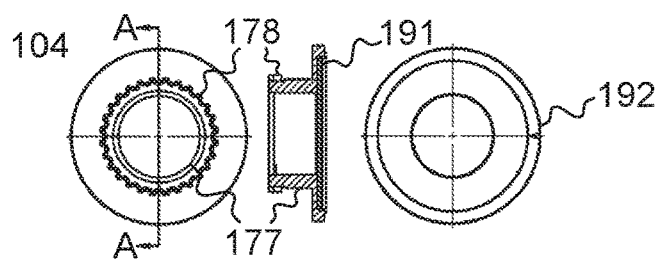
FIGS. 4A-4C show various views of a rotation angle scale assembly of the assembly of FIG. 1.
Figures 5A, 5B, 5C, 5D, 5E:
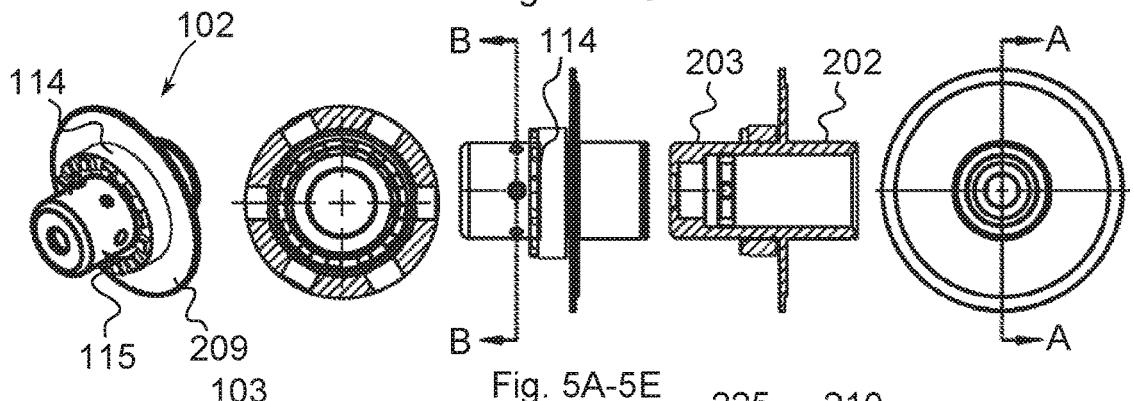
FIGS. 5A-5E show various views of a retainer cap assembly of the assembly of FIG. 1.
Figures 6A, 6B, 6C:
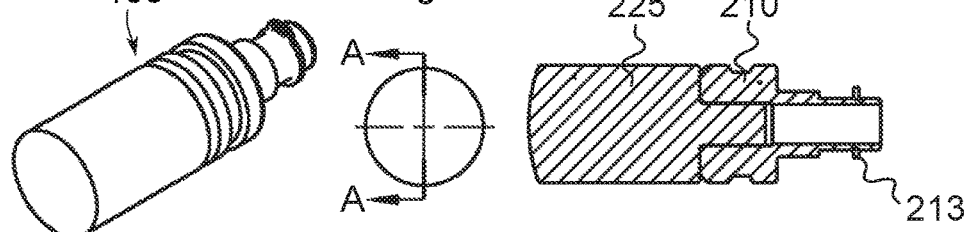
FIGS. 6A-6C show various views of a plunger/button assembly of the assembly of FIG. 1.
Figures 7A, 7B, 7C, 7D, 7E:
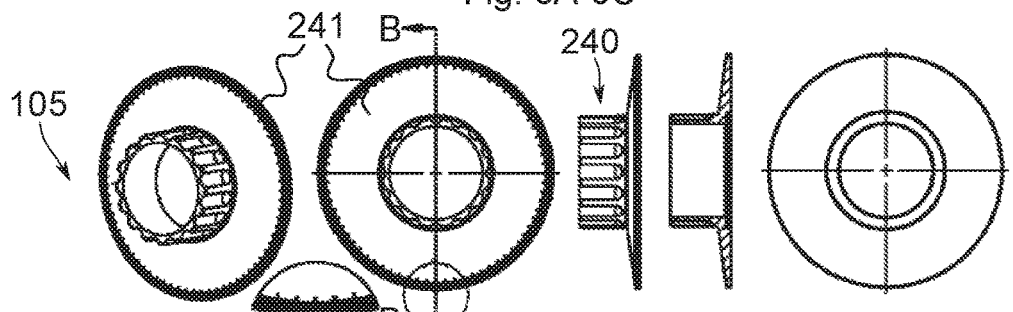
FIGS. 7A-7E show various views of rotation angle indicator assembly of the assembly of FIG. 1.

Referring to FIGS. 1A-1E, these show a rotation angle indicating retainer assembly 100 for use with and/or integrated with a hydraulically driven device 1 for tightening and loosening a threaded fastener. Rotation angle indicating retainer assembly 100 has an axis A and includes: a retainer cap assembly 102; a plunger/button assembly 103; a rotation angle scale assembly 104; and a rotation angle indicator assembly 105. Rotation angle indicating retainer assembly 100, when uninstalled from device 1, substantially has the following physical attributes. Plunger/button assembly 103 is formed substantially within retainer cap assembly 102. Retainer cap assembly 102 is formed substantially between rotation angle indicator assembly 105 and rotation angle scale assembly 104. Rotation angle indicator assembly 105 is formed substantially over retainer cap assembly 102. And rotation angle scale assembly 104 is formed substantially under retainer cap assembly 102.

Figure 8:
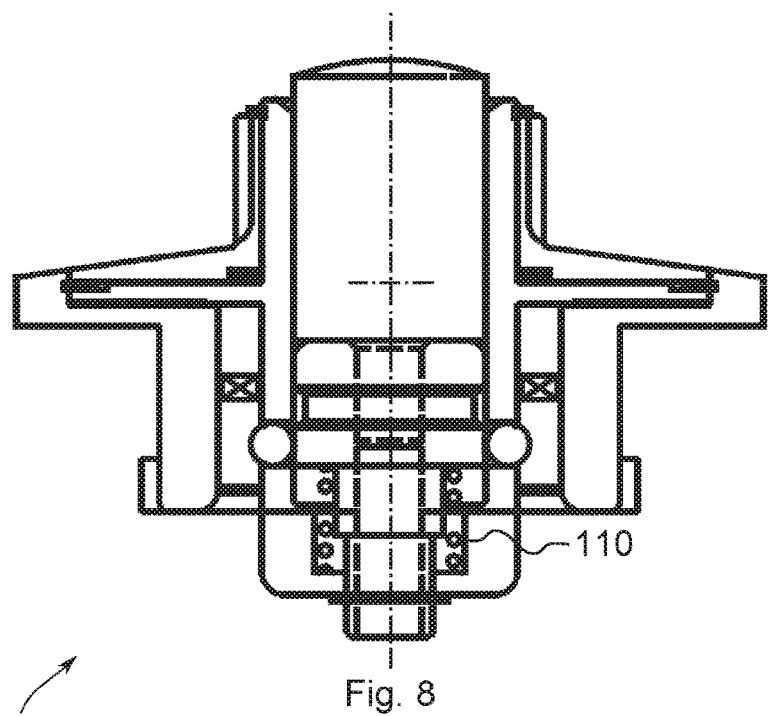
FIG. 8 shows a cross-sectional view of an engaged and locked self-retaining drive shaft assembly of the present invention.
Figure 9:
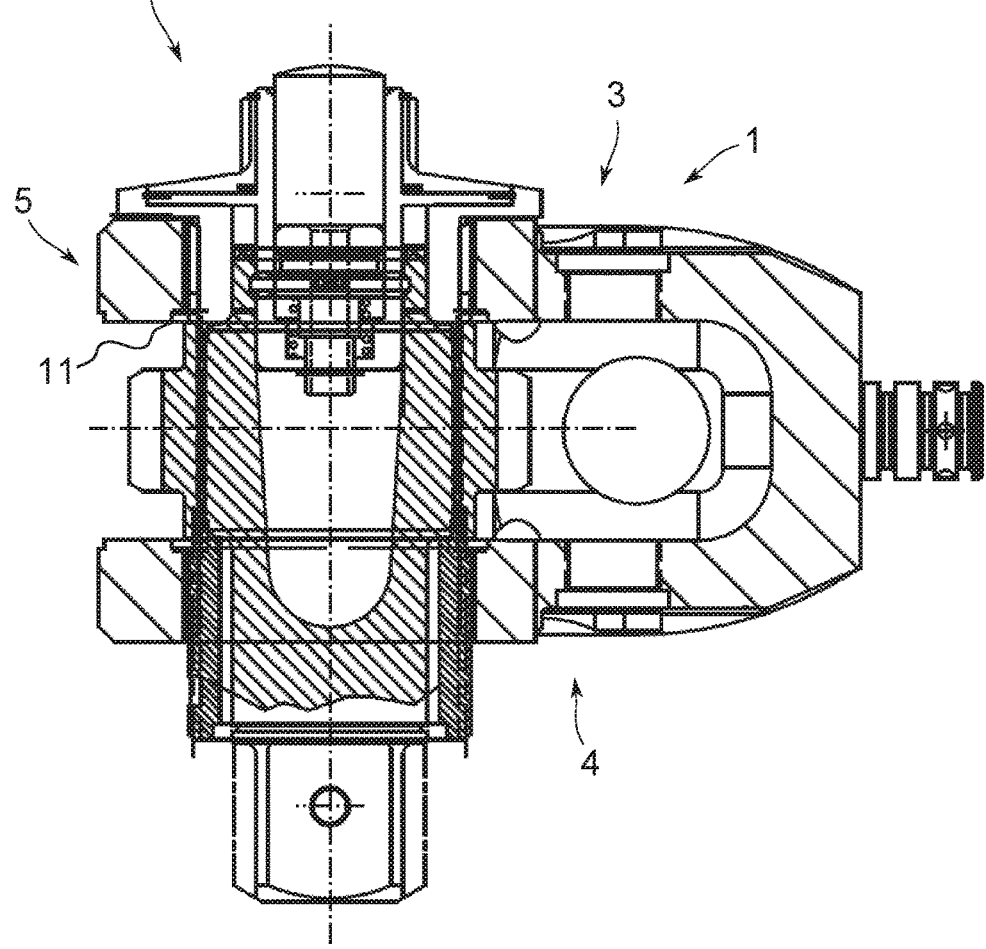
FIG. 9 shows a cross-sectional view of an engaged and locked self-retaining drive shaft assembly of the present invention integrated with the drive shaft assembly of the hydraulically driven tool.

Referring to FIGS. 8-9, these show an engaged and locked rotation angle indicating retainer assembly 100 both integrated with and without a square drive shaft torque output assembly 101 of hydraulically driven tool 1. Drive shaft assembly 101 includes a reaction force assembly 120 (not marked) and includes: a spline sleeve bushing 121; a reaction arm bushing 122; and a set screw 123 (all not marked). Rotation angle indicating retainer assembly 100, when installed on device 1, substantially has the following physical attributes. Plunger/button assembly 103 is formed substantially within retainer cap assembly 102. Retainer cap assembly 102 is: formed substantially between rotation angle indicator assembly 105 and rotation angle scale assembly 104; and attached nonrotatably relative to a square drive shaft torque output assembly 101 of the device 1. Rotation angle indicator assembly 105 is formed substantially over retainer cap assembly 102. And rotation angle scale assembly 104 is: formed substantially under retainer cap assembly 102; and attached nonrotatably relative to a driving portion 5 of a housing 3 of device 1.

Referring to FIGS. 2-7, these show various views of assembly of components of rotation angle indicating retainer assembly 100. Retainer cap assembly 102 has: a substantially hollow cylindrical shape with an upper hollow portion 202; a lower hollow portion 203; a hollow disc 209; a ring 114 having polygonal connection formations 115; and a ball bearing assembly 111. Plunger/button assembly 103 has a substantially cylindrical shape with: a connection portion 210; a depression portion 225; a compression spring 110; and a lower retaining ring 213. Rotation angle scale assembly 104 has a substantially hollow cylindrical shape with: an upper hollow disc 191; an arrow indicator 192; and a lower portion 177 having polygonal formations 178. Rotation angle indicator assembly 105 has a substantially hollow cylindrical shape with: an upper rotation angle dial 240; and a lower portion having a rotation angle scale 241, an upper retaining ring 242, a wave spring 243 and friction ring 244. Friction ring 244 allows upper rotation angle dial 240 to be reset to zero after a pre-determined pre-torque is achieved on the fastener.

Generally rotation angle indicating retainer assembly 100, and/or components thereof is attachable to either: a torque output drive and a housing portion of device 1; or a nut or a bolthead of the fastener and a housing of a hydraulically driven device. In the former, the torque output drive is square drive shaft torque output assembly 101 and the housing portion is driving housing portion 5, such that: the polygonal connection formations 115 of the ring 114 of the retainer cap assembly 102 is attached nonrotatably relative to polygonal connection formations 154 of the square drive shaft torque output assembly 101; and the polygonal connection formations 178 of the lower portion 177 of rotation angle scale assembly 104 is attached nonrotatably relative to polygonal connection formations 11 of driving housing portion 5 of device 1. In this case, friction ring 244 allows upper rotation angle dial 240 to rotate together with square drive shaft torque output assembly 101 and be reset to zero after a pre-determined pre-torque is achieved on the fastener. Polygonal connection formations 115 and 154 are cooperating face-tooth castellations, and wherein polygonal connection formations 178 and 11 are cooperating splines. Rotation angle indicating retainer assembly 100 may be used with such tools like Applicant's HYTORC® AVANTI® or HYTORC® ICE®. In the latter, another embodiment of the rotation angle indicating retainer assembly of the present invention (not shown) is used with a hydraulically driven device of the kind having a pass-through socket, like Applicant's HYTORC® STEALTH®.

Note that the height of an uninstalled rotation angle indicating retainer assembly 100 is greater than a height of an installed rotation angle indicating retainer assembly 100. During installation/operation an operator presses plunger/button assembly 103 such that: it moves downward and into a recess 153 in and around an upper portion 150 of square drive shaft torque output assembly 101 of device 1. Ball bearings 111E-H move outward through ball bearing holes 111A-D of retainer cap assembly 102 and into a recess 163 of square drive shaft torque output assembly 101. Compression spring 110 compresses into its installed position.

Note that rotation angle indicating retainer assembly 100 may include similar components as a self-retaining drive shaft assembly of unitary construction of co-pending PCT Application Serial No. PCT/US2014/50002, having Filing Date of 6 Aug. 2014, entitled "APPARATUS FOR TIGHTENING THREADED FASTENERS", an entire copy of which is incorporated herein by reference. Note that rotation angle indicating retainer assembly 100 may include similar components as disclosed in U.S. Application Ser. No. 62/050,200, having Filing Date of 15 Sep. 2014, entitled "APPARATUS FOR TIGHTENING THREADED FASTENERS", an entire copy of which is incorporated herein by reference.

Note that a preferred embodiment of rotation angle indicating retainer assembly 100 is manual but other embodiment(s) may include either a mechanical or electronic rotary encoder, a synchro, a resolver, a rotary variable differential transformer (RVDT), or a rotary potentiometer.

Advantageously rotation angle indicating retainer assembly 100: is not connected with a device power source; is not used in a feedback loop between the device, the device power source and/or the fastener; is able to be zeroed once an operator wishes to observe an angle of rotation of the fastener; is of unitary construction; requires no loose parts or external implements to engage and secure a drive shaft to the drive head of the tool; reduces likelihood of tool failure during operation due to improper engagement of the drive shaft; and increases user safety during tool operation.

The present invention also seeks to protect the following combinations and/or systems, including: a combination of rotation angle indicating retainer assembly 100 and square drive shaft torque output assembly 101; a hydraulically driven device (like 1) for tightening and loosening of threaded fasteners having the combination of rotation angle indicating retainer assembly 100 and square drive shaft torque output assembly 101; a system including a threaded fastener and a hydraulically driven device (like 1) for tightening and loosening of threaded fasteners having the combination of rotation angle indicating retainer assembly 100 and square drive shaft torque output assembly 101; and, generally, a combination of a rotation angle indicating retainer assembly and a device for tightening and loosening a threaded fastener, as disclosed in the present application.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

While the invention has been illustrated and described as embodied for use with a fluid operated tool, it is not intended to be limited to the details shown. Various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

When used in this specification and claims, the terms "comprising", "including", "having" and variations thereof mean that the specified features, steps or integers are included. The terms are not to be interpreted to exclude the presence of other features, steps or components.

What is claimed is:

1. A rotation angle indicating retainer assembly for use with and/or integrated with a hydraulically driven device for tightening and loosening a threaded fastener, the rotation angle indicating retainer assembly including: a retainer cap assembly having a hollow cylindrical shape with an upper hollow portion, a lower hollow portion, a hollow disc, a ring having polygonal connection formations and a ball bearing assembly; a plunger assembly having a cylindrical shape with a connection portion, a depression portion, a compression spring and a lower retaining ring; a rotation angle scale assembly having a hollow cylindrical shape with an upper hollow disc with an arrow indicator and a lower portion having polygonal formations; a rotation angle indicator assembly having a hollow cylindrical shape with an upper rotation angle dial, a lower portion having a rotation angle scale, an upper retaining ring, a wave spring and a friction ring; wherein the rotation angle scale assembly is nonrotatably attachable to a driving portion of a housing of the device, and wherein the retainer cap assembly is nonrotatably attachable to a square drive shaft torque output assembly of the device.

2. A rotation angle indicating retainer assembly of claim 1 wherein the friction ring allows the upper rotation angle dial of the rotation angle indicator assembly to be reset to zero after a pre-determined pre-torque is achieved on the fastener.

3. A rotation angle indicating retainer assembly of claim 1, wherein when uninstalled on the device:
the plunger assembly is formed within the retainer cap assembly;
the retainer cap assembly is formed between the rotation angle indicator assembly and the rotation angle scale assembly;

the rotation angle indicator assembly is formed over the retainer cap assembly; and the rotation angle scale assembly is formed under the retainer cap assembly.

4. A rotation angle indicating retainer assembly of claim 3 wherein a height of an uninstalled assembly is greater than a height of an installed assembly.

5. A rotation angle indicating retainer assembly of claim 1, wherein when installed on the device:

the plunger assembly is formed within the retainer cap assembly;

the retainer cap assembly is:
formed between the rotation angle indicator assembly and the rotation angle scale assembly;
attached nonrotatably to the square drive shaft torque output assembly of the device;

the rotation angle indicator assembly is formed over the retainer cap assembly;

the rotation angle scale assembly is:
formed under the retainer cap assembly; and
attached nonrotatably to the driving portion of a housing of the device.

6. A rotation angle indicating retainer assembly of claim 1 wherein the polygonal connection formations of the ring of the retainer cap assembly is attached nonrotatably to polygonal connection formations of the square drive shaft torque output assembly; and the polygonal connection formations of the lower portion of rotation angle scale assembly is attached nonrotatably to polygonal connection formations of driving housing portion of device.

7. A rotation angle indicating retainer assembly of claim 6 wherein the friction ring allows the upper rotation angle dial to rotate together with the square drive shaft torque output assembly and be reset to zero after a pre-determined pre-torque is achieved on the fastener.

8. A rotation angle indicating retainer assembly of claim 6 wherein the polygonal connection formations of the retainer cap assembly and the polygonal connection formations of the square drive shaft torque output assembly are cooperating face-tooth castellations, and wherein the polygonal connection formations of the rotation angle scale assembly and the polygonal connection formations of the driving housing portion are cooperating splines.

9. A rotation angle indicating retainer assembly of claim 1 wherein during operation an operator presses the plunger assembly such that: it moves downward and into a recess in and around an upper portion of a square drive shaft torque output assembly of the device; ball bearings move outward through ball bearing holes of retainer cap assembly and into a recess of square drive shaft torque output assembly; and compression spring compresses.

10. A rotation angle indicating retainer assembly of claim 1 which is manual.

11. A rotation angle indicating retainer assembly of claim 1 including either a mechanical or electronic rotary encoder, a synchro, a resolver, a rotary variable differential transformer (RVDT), or a rotary potentiometer.

12. A hydraulically driven device for tightening and loosening of a threaded fastener having the rotation angle indicating retainer assembly of claim 1.

* * * * *